(No Model.)  2 Sheets—Sheet 1.
T. B. STEWART.
STREET RAILWAY CAR.
No. 326,527. Patented Sept. 15, 1885.
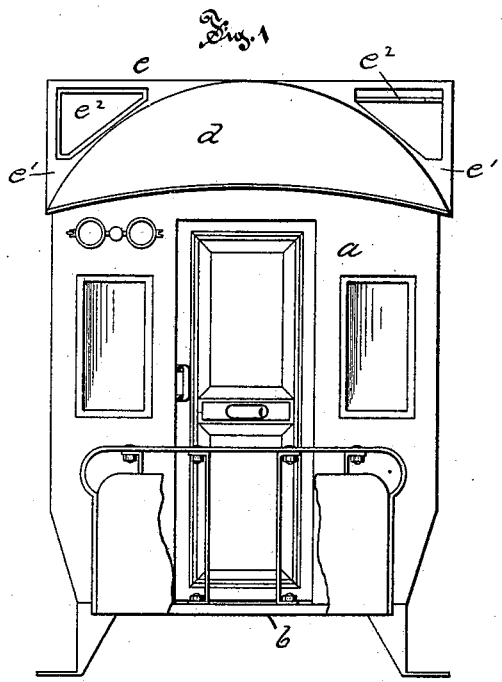
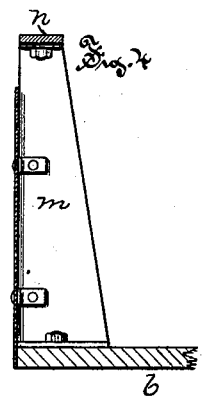
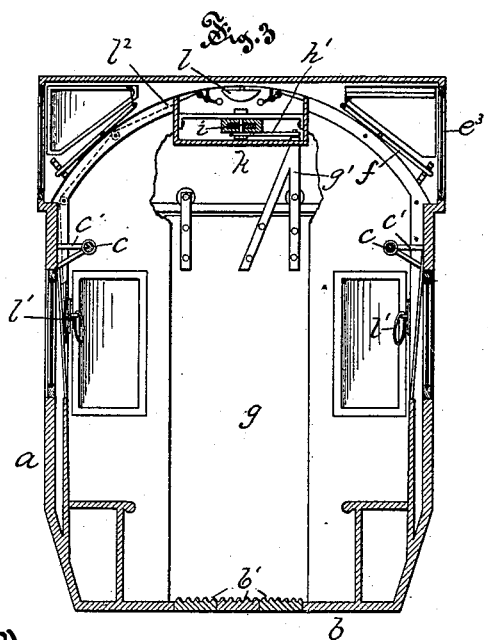
Witnesses
W. M. Bjorkman
H. R. Williams
Inventor
Timothy B. Stewart
by Simonds & Burdett,
Attys

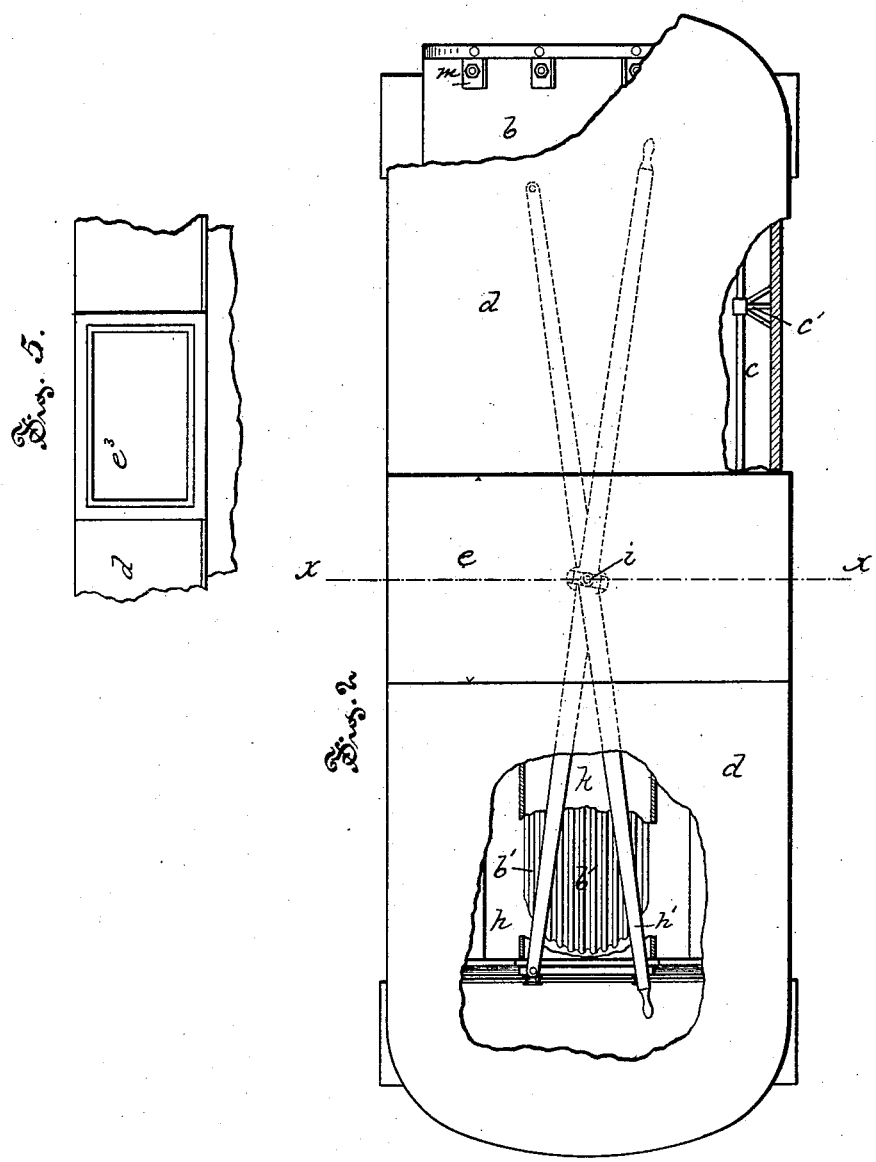

UNITED STATES PATENT OFFICE.

TIMOTHY B. STEWART, OF HARTFORD, CONNECTICUT.

STREET-RAILWAY CAR.

SPECIFICATION forming part of Letters Patent No. 326,527, dated September 15, 1885.

Application filed November 24, 1884. (No model.)

*To all whom it may concern:*

Be it known that I, TIMOTHY B. STEWART, of Hartford, in the county of Hartford and State of Connecticut, have invented certain new and useful Improvements in Street-Railway Cars, of which the following is a description, reference being made to the accompanying drawings, where—

Figure 1 is an end view of a street-railway car that embodies my improvements, part only of the new features being shown. Fig. 2 is a top view of such a car with parts broken away to illustrate several of the new features. Fig. 3 is a view in central vertical section of the car on plane denoted by line $x\ x$ of Fig. 2. Fig. 4 is a view in vertical section through the dash of the car and part of the platform. Fig. 5 is a detail view in elevation of part of the side and roof of the car near the center, showing the side window in the raised roof.

The object of my invention is to provide a street-railway car that shall embody in its construction certain improvements in the floor, in the location and arrangement of the holding-bar, in the structure of the roof, and in certain other details, as more particularly hereinafter described.

In the accompanying drawings, the letter $a$ denotes the car as a whole; $b$, the floor of the car, the central portion of which, lengthwise of the car, is formed of planks having in their upper surfaces corrugations $b'$, integral with the floor-planks; $c$, the holding-bars or hand-rails that are secured by brackets $c'$ to each side of the car and run lengthwise of it on about the level of the head of a passenger when standing. These holding-bars are arranged well back from the center of the car, which is left free of all straps or like obstructions.

The letter $d$ denotes the roof of the car, that is curved transversely of the car, except for a certain portion, $e$, near the center of the car where the roof is nearly flat, which construction leaves the angular projecting parts $e'$ of the roof when the car is viewed from either end. In the vertical walls of this projecting part of the roof openings are made which are closed by windows $e^2\ e^3$. The windows $e^2$ are pivoted in the openings and are opened and closed by means of the lever-handles $f$, that are pivoted to the walls and connected by means of a link to the window. The other end of the lever opposite the link fits in sockets in a sort of rack, and when held in the lower one of the sockets the window is closed, as shown on the left of Fig. 3, and when it is in the upper socket the window is held open, as shown on the right in Fig. 3. By opening these windows a steady draft of air is maintained through the top of the car when the latter is in motion and thorough ventilation insured. The side windows, $e^3$, in this raised portion of the roof may be lettered with the name of the car or its destination.

Each end of the car is provided with sliding doors $g$, hung from the top rail in any ordinary manner, one bracket, $g'$, on each door, however, being extended vertically and connected to one end of a lever, $h$, that is pivoted to a brace or part of the frame near the center of the car, the other end of the lever extending out through the opposite end of the car a sufficient distance to enable it to be grasped and operated by a person standing at that end, so as to open or close the farther door. Two levers are used and they cross each other at the pivot $i$. These levers $h$ and $h'$, by means of the peculiar construction of the socket-pieces, cross each other vertically as well as horizontally, and can therefore be compactly arranged. The box or case $k$ is fastened along the whole length of the car at the center of the ceiling, and covers these levers, and also incloses one or more bells, $l$, which may be rung by the passengers by pulling upon the sliding bell-pulls $l'$, that are attached to the car on opposite sides and are connected each to the hammer of the bells by means of the wire or cord $l^2$, that passes over rollers attached to the frame-work of the car.

Each platform is provided with a dash secured to a frame-work that is held in place by means of the flat braces $m$, that are bent at top and bottom at right angles to their length and fastened to the floor and rail $n$, respectively, by means of bolts. The bolt-holes through the top rail may be countersunk on the upper side, and the heads of the bolts seated in the countersunk sockets, and the nuts placed below the rail or brace, thus leaving a smooth surface on the upper side of the rail and avoiding the necessity of covering the latter with wood.

One special advantage resulting from my improved arrangement of the holding-bars or hand-rails is that no holding-straps are needed and the bars are within easy reach of the passengers and afford a holding-brace in a position that prevents them from swaying sidewise in the car when it is in motion. It leaves the central portion of the car more open, and adds to the appearance of the car and comfort of the passengers.

The hand-rail $c$ is not only so low as to do away with hand-straps, but is so near the side as not to overhang the front edge of the seat, and is preferably directly over the center of the latter, so that there is no chance for it to be in the way of the heads of the passengers using the car as they lean naturally slightly forward in sitting down and rising sufficiently to avoid striking the bar.

As to the floor, I am aware that it is not new to corrugate the floors of cars, but such corrugations have always been formed by nailing or screwing on strips or battens at intervals widthwise of the car, and these strips are liable to spring up at the ends, and I do not broadly claim a corrugated floor. These corrugations are not only formed integral with the floor-planks, but they are of peculiar shape in cross-section, in that there are no corners or angles in the corrugated part of the floor, the bottoms and sides of the curves and the tops of the projections being all formed in curved planes, as shown in cross-section in Fig. 3. This enables the floor to be readily cleaned and permits the ready recovery of money or like articles that may be dropped upon the floor.

I claim as my improvement—

1. The street-railway car $a$, having a floor, $b$, formed of planks with integral longitudinal corrugations $b'$, the bounding surfaces of which are formed in curved planes in cross-section, all substantially as described.

2. The improved street-railway car $a$, having a floor formed of planks $b$, with integral corrugations $b'$, holding-bars $c$, bracketed to the sides of the car, and a roof, $d$, having the raised central projection, $e$, provided with ventilators $e^2$, all substantially as described.

3. A street-railway car, $a$, having the holding-bars $c$, bracketed to the sides of the car on a level below the head of the average passenger and projecting from the side of the car no farther than the front edge of the car-seat, all substantially as described.

TIMOTHY B. STEWART.

Witnesses:
CHAS. L. BURDETT,
H. R. WILLIAMS.